United States Patent
Bloching et al.

(10) Patent No.: US 7,930,251 B2
(45) Date of Patent: Apr. 19, 2011

(54) MODEL DRIVEN STATE MANAGEMENT OF APPLICATIONS

(75) Inventors: Uwe Bloching, Nussloch (DE); Frank Brunswig, Heidelberg (DE); Bernhard Drabant, Muehlhausen (DE)

(73) Assignee: SAP AG, Walldorf (DE)

( * ) Notice: Subject to any disclaimer, the term of this patent is extended or adjusted under 35 U.S.C. 154(b) by 876 days.

(21) Appl. No.: 11/836,697

(22) Filed: Aug. 9, 2007

(65) Prior Publication Data
US 2009/0044202 A1 Feb. 12, 2009

(51) Int. Cl.
*G06F 7/00* (2006.01)
*G06F 17/00* (2006.01)
(52) U.S. Cl. ........................ 705/51; 707/600
(58) Field of Classification Search ............... 705/1–45, 705/50–79; 707/600
See application file for complete search history.

(56) References Cited

U.S. PATENT DOCUMENTS

| 6,784,901 B1* | 8/2004 | Harvey et al. ............... 715/757 |
| 7,587,502 B2* | 9/2009 | Crawford et al. ............ 709/229 |
| 7,711,586 B2* | 5/2010 | Aggarwal et al. ............... 705/5 |
| 2008/0010539 A1* | 1/2008 | Roth ............................. 714/38 |

* cited by examiner

*Primary Examiner* — Andrew J. Fischer
*Assistant Examiner* — Murali Dega
(74) *Attorney, Agent, or Firm* — Mintz, Levin, Cohn, Ferris, Glovsky & Popeo, P.C.

(57) ABSTRACT

The subject matter disclosed herein provides methods and apparatus, including computer program products, for model driven state management of applications. In one aspect, there is provided a computer-implemented method. The method may include instantiating one or more business objects associated with an application. The transitions between states of the application may be checked using one or more models defined based on at least one of a context of the business object and a context of the application. An indication regarding the results of checking of the transitions may be provided to a user interface. Related apparatus, systems, methods, and articles are also described.

17 Claims, 5 Drawing Sheets

MODEL DRIVEN STATE MANAGEMENT OF APPLICATIONS

FIELD

The present disclosure generally relates to managing the state of an application using a model.

BACKGROUND

In a client-services architecture, a client system, such as a computer, may call an application, such as a program, a service, or a web service, at a server to interact with the application through the Internet or an intranet. A service, such as a web service, is an application (or program) that makes itself available over the Internet or an intranet, uses standardized messaging, such as XML (extensible Markup Language) and Simple Object Access Protocol (SOAP), and uses some type of location mechanism, such as UDDI (Universal Description, Discovery, and Integration), to locate the service and its public Application Program Interface (API).

To call a service through the Internet or intranet, the client system makes a call (e.g., using messages) through an API, which defines the way the client communicates with the service. The service instantiates objects, such as business objects, in response to the API call. The term "object" refers to a data structure including at least one, of data and related methods, while the phrase "business object" refers to an object used in connection with a business process or task.

An example of a service is a "flight reservation" service, which can be called through a network (e.g., the Internet and/or the intranet) by a client system. The flight reservation service may allow a user at a client system to perform a variety of flight reservation tasks, such as display flight data, calculate fare including any tax, save (i.e., make) a flight reservation, and edit (i.e., modify) flight reservations.

FIG. 5 depicts examples of the business objects 402-408 that may be associated with the flight reservation service. The business objects may, for example, correspond to a flight reservation service (e.g., business object 402), a business object for displaying a flight reservation (e.g., business object 404), a business object for calculating a fare including any tax (e.g., business object 406), a business object for modifying a flight reservation (e.g., business object 408). In the example of FIG. 5, business objects 404-408 are so-called "dependent" business objects since they depend from business object 402. The dependent business objects 404-408 include associations 416a-c to business object 402. The associations 416a-c are links (or pointers) associating business objects to other business objects and provide structure to the business objects. Although FIG. 5 depicts four, simplified business objects, actual implementations of business objects may include hundreds if not thousands of business objects with complex associations, methods, and/or data. Moreover, each of these business objects may have entities with attributes defined by a developer.

SUMMARY

The subject matter disclosed herein provides methods and apparatus, including computer program products, for model-driven state management of applications. In one aspect, there is provided a computer-implemented method. The method may include instantiating one or more business objects associated with an application. The transitions between states of the application may be checked using one or more models defined based on at least one of a context of the business object and a context of the application. An indication regarding the results of checking of the transitions may be provided to a user interface.

It is to be understood that both the foregoing general description and the following detailed description are exemplary and explanatory only and are not restrictive. Further features and/or variations may be provided in addition to those set forth herein. For example, the implementations described herein may be directed to various combinations and subcombinations of the disclosed features and/or combinations and subcombinations of several further features disclosed below in the detailed description.

Figure 1:
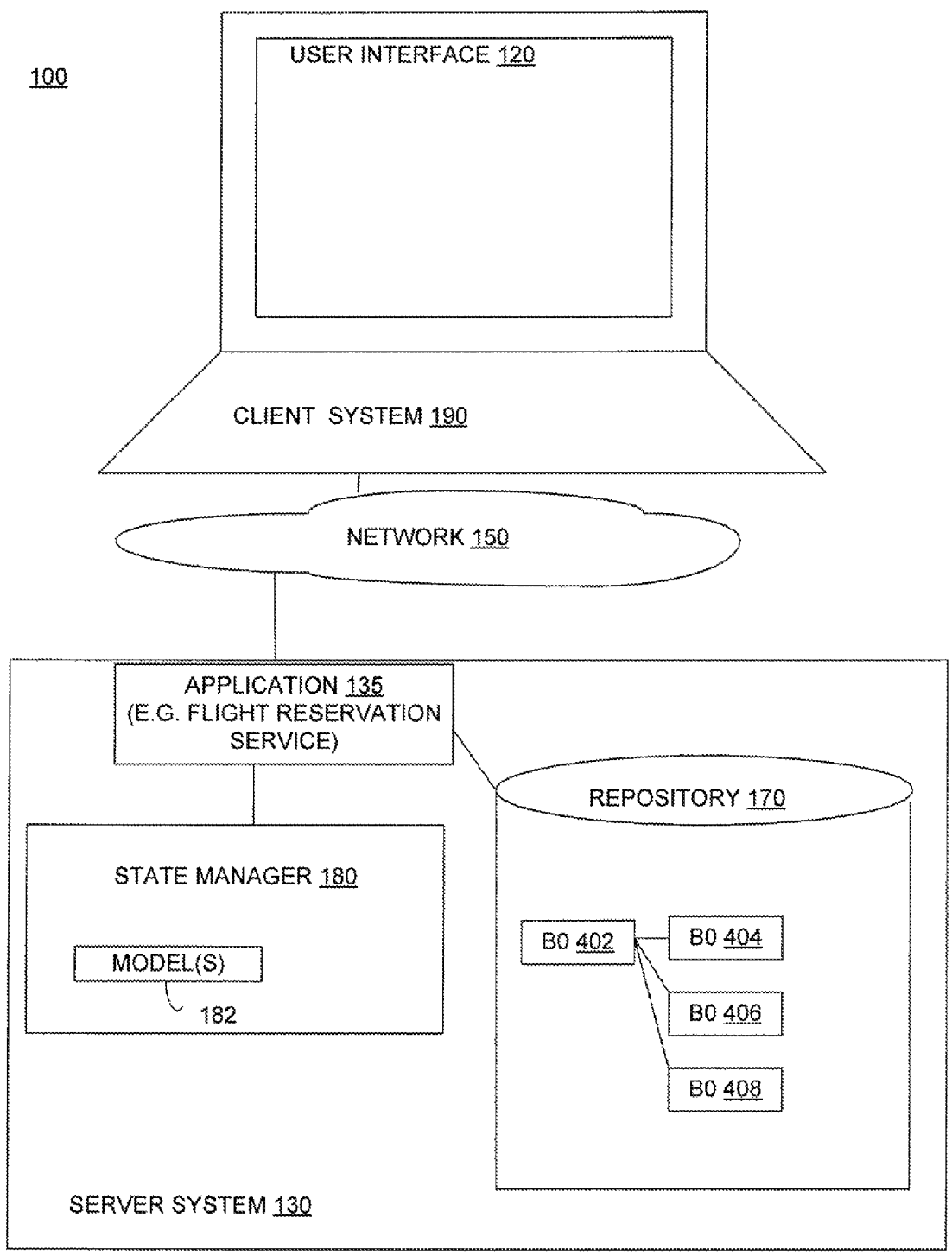
FIG. 1 depicts a system for model driven state management.

Like labels are used to refer to same or similar items in the drawings.

DETAILED DESCRIPTION

Business objects are considered the building blocks of applications, such as programs, services, and web services. Business objects (BOs) are comprised of entities, such as BO nodes, actions, queries (e.g., methods), structure attributes, and the like. Moreover, these entities may have defined properties, such as read-only for a structure attribute, display-only, and the like. Furthermore, each property may be defined to have an assigned set of possible values. For example, an entity may have one or more properties, each of which may have a set of possible values, depicted as follows:

$$\text{Entity 1: Property1: \{value11, value12 ... value 1n\}} \quad \text{[Equation 1],}$$

$$\text{Property2: \{value21, value 22 ... value 2m\}} \quad \text{[Equation 2],}$$

$$\text{Entity 2: Property1: \{value11, value12 ... value 1n)\}} \quad \text{[Equation 3],}$$

$$\text{Property3: \{value31, value 32 ... value 3p\}} \quad \text{[Equation 4],}$$

wherein Entity 1 and Entity 2 represent the entities of BOs, Property1, Property2, Property3 represent properties of BOs, and value11, value 1n, value 21, and so forth represent the set of possible values for a corresponding property. At any given point in time during runtime, each individual property has a specific value assigned.

Moreover, a BO context describes constraints for the allowed sets of values of the properties of an entity. In other words, the BO context defines the set of possible values of the properties of a BO. For the example above, a BO context may be given as follows:

Context1:

$$\text{Entity1: Property1: \{value11, value 1n\}} \quad \text{[Equation 5],}$$

$$\text{Property2: \{value 22\}} \quad \text{[Equation 6],}$$

$$\text{Entity2: Property1: \{value12\}} \quad \text{[Equation 7],}$$

$$\text{Property3: \{value31, value 32 ... Value 3p\}} \quad \text{[Equation 8].}$$

Equations 5-8 thus represent the set of possible values (e.g., true, false, 1, 0, and etc.) of a property of a BO.

One or more business objects may be provided as part of an application, so that the business objects include a set of modeled BO contexts. Furthermore, one or more BO contexts may be provided as a so-called "standard" BO context by a provider of BOs or may be tailored by application developers. These BOs may serve as the building blocks of an application, such as an application used in an Enterprise Services Infrastructure or the flight booking system described herein. As such, when designing the application, the developer specifies (e.g., defines) for each BO the corresponding BO context to be used.

Moreover, an application may be defined, so that at runtime the application adopts different states $S_1 \ldots S_n$. In addition, an application may run under different users in different roles.

The subject matter described herein relates to a model driven state management mechanism. The subject matter described herein may also enable the states of an application to be modeled at design time. Each state of an application may be defined to correspond to a well-defined set of property values within the context of each BO.

FIG. 1 depicts an exemplary system 100 for using a model to manage the states of an application including structured data, such as objects and business objects. The system 100 includes a client system 190 coupled to a server system 130 through a communication mechanism 150 (e.g., a network, the Internet, an intranet, inter-process communication, or a combination of the aforementioned communication mechanisms). The client system 190 and server system 130 may be implemented as a processor, such as a computer, server, and the like.

The client system 190 further includes one or more applications, such as a user interface 120. The user interface 120 may be any application used to interface with other applications, such as programs, services, web services, and the like. For example, the user interface 120 may include a browser or client application to interface with (and/or access) an application, such as application 135 at server 130.

Application 135 may be implemented as any application, such as a service, a web service, and the like. For example, application 135 may be implemented as a flight reservation service (or web service). When that is the case, application 135 may have one or more states, such as a modify data state, display data state, calculate tax state, and the like. The subject matter described herein provides one or more models, such as model 182, to define and to, manage the states of an application, such as application 135.

The server system 130 also includes a repository 170 including business objects 402-408, although other types of data, such as objects, may be included in repository 170 as well. As noted above, the term "object" refers to a data structure including at least one of data and related methods, while the phrase "business object" refers to an object used in connection with a business process or task. FIG. 1 depicts business objects (labeled "BO") 402-408 included within repository 170.

The server system 130 further includes state manager 180. User interface 120 may access state manager 180 to manage and/or to define at least one of the following: one or more BOs, BO contexts, states, application contexts, application state transitions, and the like.

The state manager 180 may be implemented as a program or component, i.e., a small binary object (e.g., an applet) or program that performs a specific function and is designed in such a way to operate easily with other components and applications, such as a service, web service, and/or user interface 120. In some implementations, state manager 180 is implemented as a service (e.g., as part of SAP's Enterprise Services Framework) or web service accessible by other applications through an intranet and/or the Internet. The state manager 180 may perform one or more of the following functions: define one or more models; define one or more BO contexts; define states of applications; define BO contexts; define transition states (or so-called rules) between states of an application; define application contexts; provide checks at runtime of the states of an application; and provide the results of the checks to a user interface.

When client system 190 calls application 135, one or more business objects 402-408 may be instantiated by application 135. The business objects 402-408 may thus serve as the so-called "building blocks" for application, 135, enabling it to perform its designated service.

State manager 180 may be used to define, for an application A (e.g., application 135), a set of BO contexts $(B_1,C_1)$, $(B_2, C_2) \ldots (B_n,C_n)$ for the business objects used in the application A. Moreover, the application A may also be defined to have a set of states $\{S_1 \ldots S_m\}$, such as "modify data", "display data", "calculate tax", and the like. Based on the BO context of an application A, a particular property value for each BO entity of the BOs are defined for every state of applications A.

A switch from an application state $S_k$ to application state $S_l$ at runtime is called a state transition. This transition may be modeled (e.g., using model 182). Moreover, the application may run under different user roles $\{R_1 \ldots R_p\}$, such as a manager, a secretary, and the like. An application context refers to a model defining the combination of BO contexts and a given user role R. For each user role R and any transitions between application states, state manager 180 may have one or more models (e.g., model 182) to define those transitions. This means that for each role R there is a transition rule representing whether a transition is allowed from one state of an application to another state of an application. The transition rule may be represented as follows:

$$T_R: \{S_1, \ldots, S_m\} \to 2^{\{S1, \ldots, Sm\}} \qquad \text{[Equation 9]},$$

wherein each state is assigned a subset of possible transition states within the set of states $\{S_1 \ldots S_m\}$. The transition rule for the user R may by represented by a Boolean matrix as follows:

$$T_R = \begin{pmatrix} t_{R,11} & t_{R,12} & \cdots & t_{R,1m} \\ t_{R,21} & \ddots & & \vdots \\ \vdots & & \ddots & \vdots \\ t_{R,m1} & t_{R,m2} & \cdots & t_{R,mm} \end{pmatrix}, \qquad \text{[Equation 10]}$$

wherein each $t_{R,kl}$ takes values a value (e.g., 0,1, false, true, and so forth). For example, the value "1" ("true") represents that user R may perform the transition from a state $S_l$ to another state $S_k$, and "0" ("false") represents that user R is not allowed to trigger that state transition from a state $S_l$ to another state $S_k$. As such, when the application is in state $S_l$ all possible state transitions are depicted in the $l^{th}$ column of the matrix $T_R$ as entries with value "1" ("true"). Equation 11 below represent the $l^{th}$ column of the matrix $T_R$.

$$S_{lk(1,\ldots,m)} = \begin{pmatrix} t_{R,1l} \\ t_{R,2l} \\ \vdots \\ t_{R,ml} \end{pmatrix}. \qquad \text{[Equation 11]}$$

In some implementations, for each user role, a subset of the given set of states can be marked in the model 182 as initial states, so that the application can determine in which state the application should start. In some implementations, the model 182 may include information representative of Equations 1-11, and incorporated into a model, such as model 182.

Figure 2:
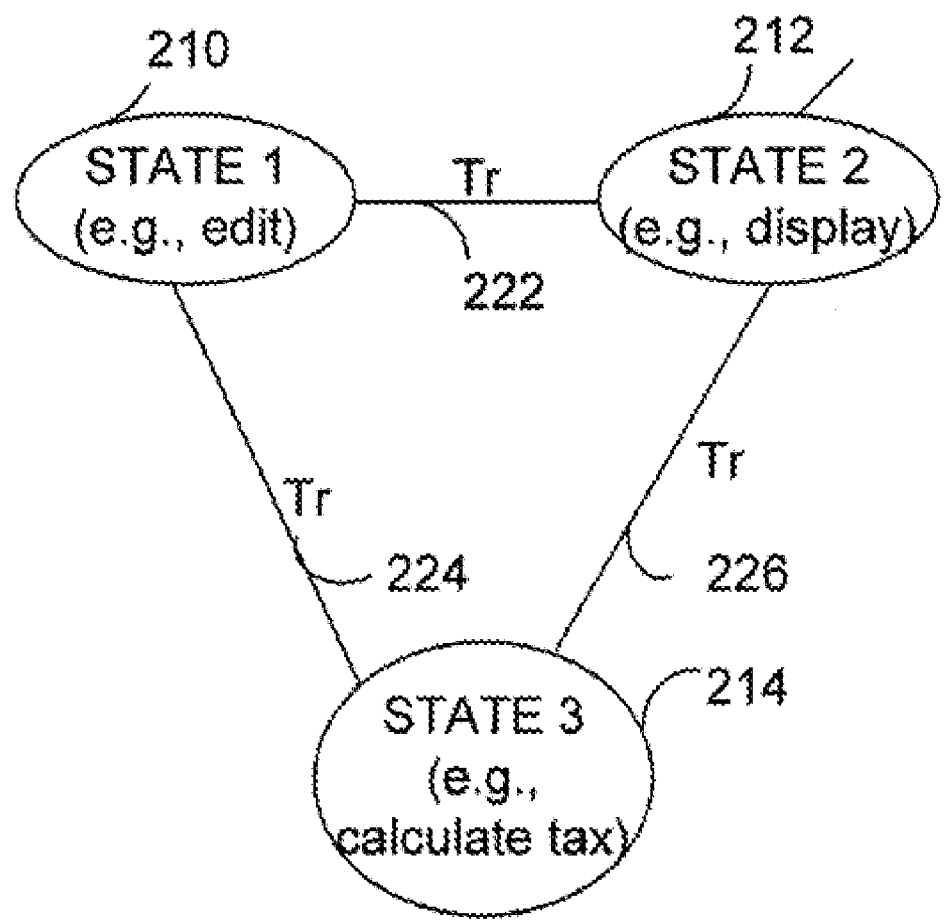
FIG. 2 is a diagram depicting different states of an application.

FIG. 2 depicts states 210-214 for an application. For example, an application may have a first state 210 for editing, such as modifying flight reservations, a second state 212 for displaying a flight reservation, a third state 214 for calculating a tax amount due on a purchased flight, and other states as well. For each of the states, there may also be defined BO contexts and application contexts. When defined, the BO context and application context may be modeled. Moreover, the transitions 222-226 between states may also be defined, as described with respect to Equations 1-11, and modeled.

Figure 3:
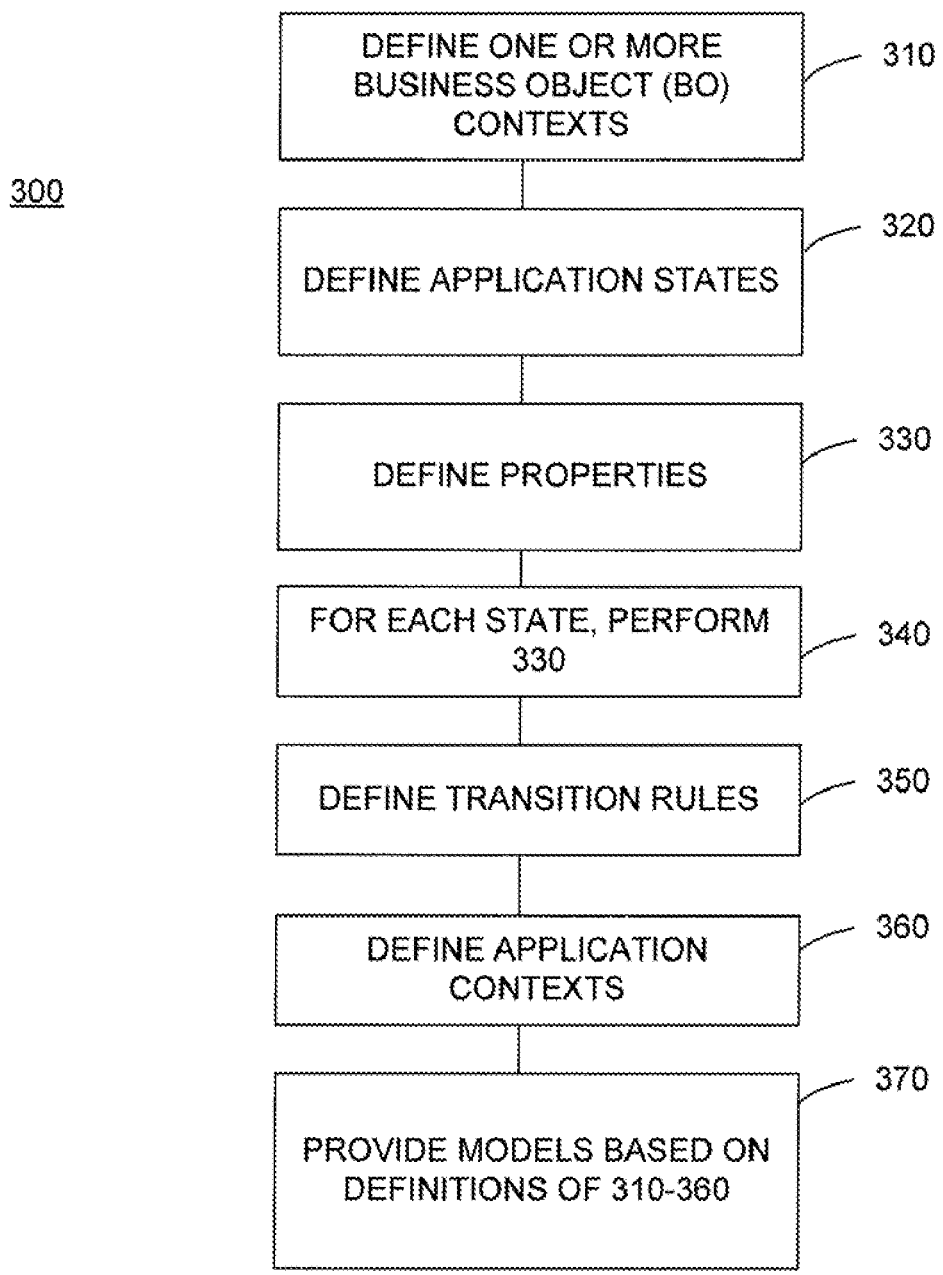
FIG. 3 is a process flow for defining models.

FIG. 3 depicts a process 300 for defining one or more models. The models may be used to manage the state of an application during runtime. For example, the model may provide runtime checks of whether a state is allowed given factors, such as the application context and BO context.

At 310, a user interface 120 may access state manager 180 to define one or more BO contexts for one or more business objects associated with an application, such as application 135. For example, application 135 may be defined by a specific set of BO contexts using the following:

$$(B_1, C1), (B_2, C2) \ldots (B_n, Cn) \quad \text{[Equation 12]},$$

wherein $B_1$ through $B_n$ represent business objects, an $C_1$ through $C_n$ represent the contexts (see, e.g., Equations 5-8 above).

At 320, a user interface 120 may access state manager 180 to define a set of states for an application, such as application 135. For example, the application, A, can adopt a set of states as follows:

$$\{S_1 \ldots S_m\} \quad \text{[Equation 13]},$$

wherein $S_1$ through $S_m$ represent the different states of an application. For example, a state may correspond to edit data, display data, save data, calculate tax, and the like.

At 330, a user interface 120 may access state manager 180 to define a set of allowable values for properties. Moreover, the definition of a set of values for each of the properties may be performed for each business object of an application, such as application 135.

At 340, for every defined state of 320, the property value definitions of 330 are repeated for all of the entities of a business object. Specifically, each state may have a different set of allowable values for the properties.

At 350, user interface 120 may access state manager 180 to define a set of transition rules between states (labelled Tr on FIG. 2). As noted, a switch from application state $S_k$ to application state $S_l$ at runtime is called a transition. The transition rules may take into account user roles as well. The roles of different user may be defined as follows: $\{R_1 \ldots R_p\}$, wherein $R_1$ represents a first role (e.g., manager), and $R_n$ represents the $n^{th}$ role (e.g., a manager, a secretary, and the like).

At 360, user interface 120 may access state manager 180 to define a set of application contexts. An application context is defined as a combination of the BO contexts of an application and a given user role. At 360, user interface 120 may access state manager 180 to define, for each user role (R), allowable transitions between application states (e.g., Equations 9-11 above). For example, for a given role, when an application includes three states as depicted in FIG. 2, Equation 10 would include three columns for each state, one for edit, one for display, and one for calculate tax, with the particular values set to 0 or 1 based on what states a user is allowed to implement in a given role.

At 370, state manager 180 uses the definitions established in 310-360 to provide models that can be used as a tool. For example, the BO contexts, application contexts, application states, and transition rules may be used as a modeling tool to support design time as well as runtime aspects of business objects. In addition, when performing a transition between application states, the corresponding change of values of entity properties can automatically be derived using the model.

Figure 4:
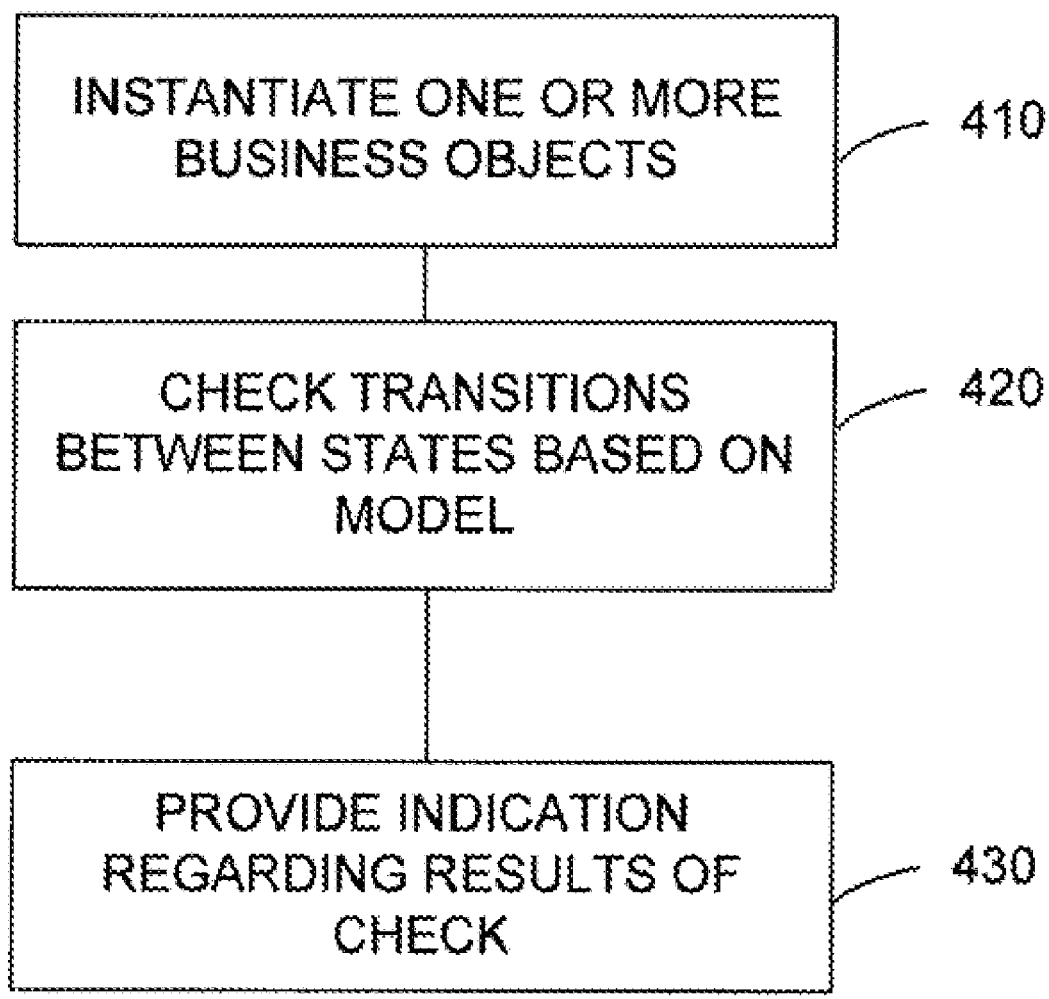
FIG. 4 is a process flow for checking transitions of states of an application using models.
Figure 5:
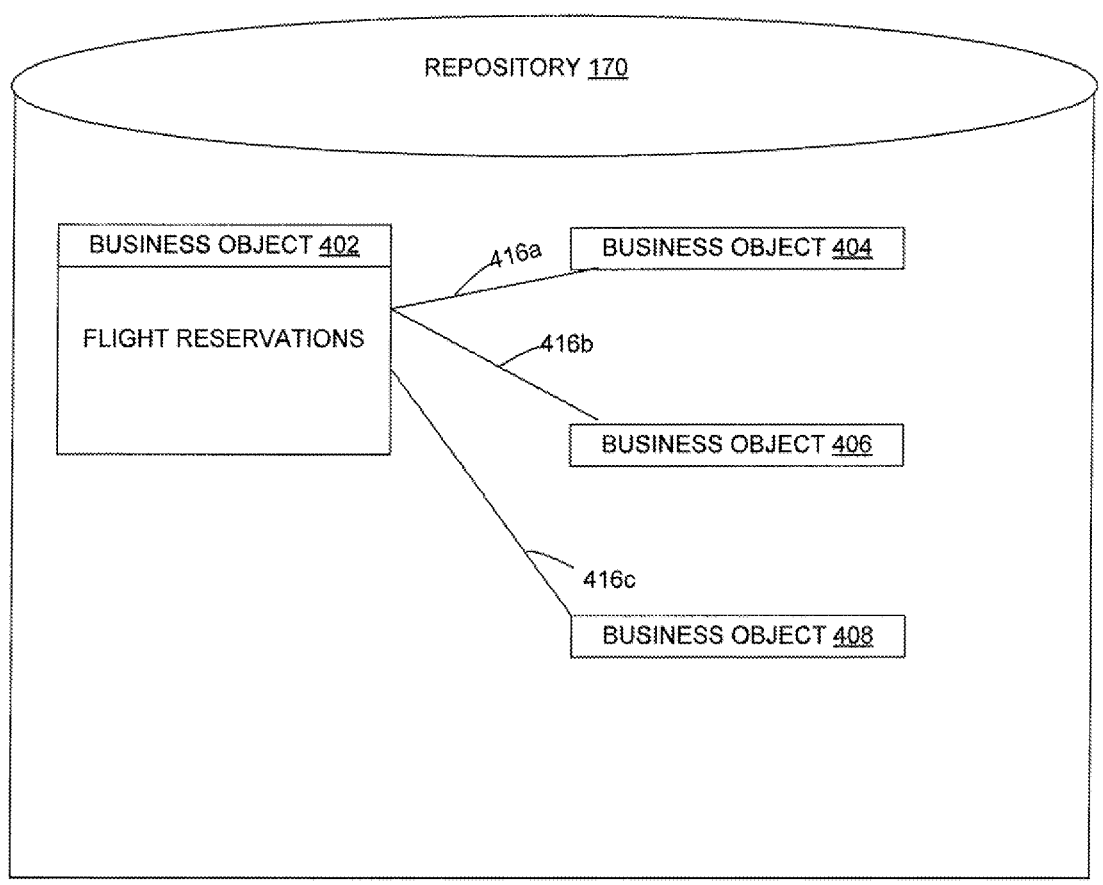
FIG. 5 depicts an example of a business object.

FIG. 4 depicts a process for using the models described herein. At 410, application 135 may instantiate business objects 402-408. At 420, state manager 180 may use one or more, such as Equations 10-11, to check the transitions between application states. In this example, Equations 10-11 serve as a model to check the transitions between states of application 135, although other equations may be used as well. At 430, an indication is provided to user interface 120. The indication represents the result of the check.

In some Implementations, when application 135 is first Initiated, the initial state of the application can be set by calling a runtime service using the following call:
  APPLICATION_RUNTIME_SERVICE→INITIALIZE_STATE (<InitialState>)

A switch of a state of an application can be activated by making the following runtime call:
  APPLICATION_RUNTIME_SERVICE→SWITCH_TO_STATE (<State>)

For each business object, a service may be called to automatically determine the properties of an entity of a business object based on the BO context and on the application state. That service may be called using the following:
  STATE=APPLICATION_RUNTIME_SERVICE→GET_CURRENT_STATE( )

To determined the allowed set of states, a service may be called using the following:

```
ALLOWED_STATES[ ]=
  APPLICATION_RUNTIME_SERVICE>GET_ALLOWED_SUBSEQUENT_STATES(<State>)
```

In some implementations, the models defined at 300 may improve the quality of application development by providing a model-based framework for defining application states and their transitions. Moreover, in some implementations, the model-based approach described herein may provide a formalism to assist in the description of application states. Moreover, at runtime, the models defined at 300 may make it possible to do automatic checks of transitions. For example, by using the matrix (e.g., of Equations 10 and/or 11), a change in state form "display" state to "edit" state may be checked using the corresponding column of the matrix. Specifically, Equation 10 may be used to check the transition of the state "display" (e.g., state $S_i$) in which the entry $t_{Rji}$ is set true for the state "edit" (e.g., state $S_j$).

In some implementations, the subject matter described herein may be used to model during a so-called "design time"

and "configuration time," although the references to design time, configuration time, and runtime are only exemplary since the subject matter described herein may be used anytime. In some implementations, configuration time refers to either design time or the time when an already running application needs to be reconfigured. Moreover, predefined user roles may be taken into account already at design time whereas additional user roles may need to be considered later when the application Is already deployed and running. The modeling of application states, the corresponding business objects entity property values for any given application state, and the transitions between the applications states relieves a user (e.g., an application programmer) from the cumbersome and error-prone task of hard coding the property value settings.

Although FIG. 1 is described with respect to a client and server architecture, system 100 may also use any other architecture or framework. Moreover, although an example of a flight reservation service is described above, any other application may be used as well.

The systems and methods disclosed herein may be embodied in various forms including, for example, a data processor, such as a computer that also includes a database, digital electronic circuitry, firmware, software, or in combinations of them. Moreover, the above-noted features and other aspects and principles of the present disclosed embodiments may be implemented in various environments. Such environments and related applications may be specially constructed for performing the various processes and operations according to the disclosed embodiments or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosed embodiments, or it may be more convenient to construct a specialized apparatus or system to perform the required methods and techniques.

The systems and methods disclosed herein may be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

The foregoing description is intended to illustrate but not to limit the scope of the invention, which is defined by the scope of the appended claims. Other embodiments are within the scope of the following claims.

What is claimed is:

1. A non-transitory computer-readable medium containing instructions to configure a processor to perform a method, the method comprising:
    instantiating one or more business objects associated with an application;
    checking transitions between states of the application using one or more models, wherein the one or more models are defined based on at least an application context comprising a business object context and a role; and
    providing to a user interface an indication representative of a result of the checking.

2. The non-transitory computer-readable medium of claim 1, wherein at least one of the business objects comprises a data structure used in connection with a business task, wherein the business object context comprises a property of the at least one of the business objects, wherein the business object context further comprises a set of values for each of the properties.

3. The non-transitory computer-readable medium of claim 1 further comprising:
    defining properties for one or more business objects.

4. The non-transitory computer-readable medium of claim 1 further comprising:
    defining transition rules using a user interface to access a state manager for defining the transition rules between states of the application.

5. The non-transitory computer-readable medium of claim 4, wherein defining the transition rules further comprises:
    defining the transition rules based on one or more user roles.

6. The non-transitory computer-readable medium of claim 1 further comprising:
    defining the application context to include one or more user roles.

7. The non-transitory computer-readable medium of claim 1 further comprising:
    providing as part of an application a set of business object contexts.

8. A method comprising:
    instantiating one or more business objects associated with an application;
    checking transitions between states of the application using one or more models, wherein the one or more models are defined based on at least an application context comprising a business object context and a role; and
    providing to a user interface an indication representative of a result of the checking, wherein at least one of the instantiation, the checking, and the providing are implemented on at least one processor.

9. The computer-implemented method of claim 8, wherein at least one of the business objects comprises a data structure used in connection with a business task, wherein the business object context comprises a property of the at least one of the business objects, wherein the business object context further comprises a set of values for each of the properties, wherein checking further comprises:
    checking transitions based on a matrix as follows:

$$S_{\overline{IK(1,\ldots,m)}} = \begin{pmatrix} t_{R,11} \\ t_{R,21} \\ \vdots \\ t_{R,m1} \end{pmatrix},$$

wherein each value in the matrix represents whether a transition may be performed between two states of the application.

10. The method of claim 8 further comprising:
    defining properties for one or more business objects.

11. The method of claim 8 further comprising:
defining transition rules using a user interface to access a state manager for defining the transition rules between states of the application.

12. The method of claim 11, wherein defining the transition rules further comprises:
defining the transition rules based on one or more user roles.

13. A system comprising:
a processor;
a memory, the processor and the memory are configured to cause operations comprising:
instantiating one or more business objects associated with an application;
checking transitions between states of the application using one or more models, wherein the one or more models are defined based on at least an application context comprising a business object context and a role; and
providing to a user interface an indication representative of a result of the checking.

14. The system of claim 13, wherein at least one of the business objects comprises a data structure used in connection with a business task, wherein the business object context comprises a property of the at least one of the business objects, wherein the business object context further comprises a set of values for each of the properties, wherein checking further comprises:
checking transitions based on a matrix as follows:

$$S_{\overline{lk(1,\ldots,m)}} = \begin{pmatrix} t_{R,11} \\ t_{R,21} \\ \vdots \\ t_{R,m1} \end{pmatrix},$$

wherein each value in the matrix represents whether a transition may be performed between two states of the application.

15. The system of claim 14 further comprising:
defining properties for one or more business objects.

16. The system of claim 15 further comprising:
defining transition rules using a user interface to access a state manager for defining the transition rules between states of the application.

17. The system of claim 16, wherein defining the transition rules further comprises:
defining the transition rules based on one or more user roles.

* * * * *